Patented Sept. 19, 1950

2,522,889

UNITED STATES PATENT OFFICE 2,522,889

PRODUCTION OF RESINOUS COMPOSITIONS

Carl F. Peters, Chicago, Ill., assignor to Velsicol Corporation, Chicago, Ill., a corporation of Illinois No Drawing. Application April 16, 1947,
Serial No. 741,958

7 Claims. (Cl. 260—23.7)

The present invention relates to novel and useful compositions of matter and to methods for their preparation.

More particularly, this invention pertains to resinous products which can be formed by a thermally induced reaction between cyclopentadiene and essentially saturated fatty acids.

One object of this invention is to provide a new type of synthetic surface coating material having particular utility in the paint and varnish field.

Another object of the invention is to provide varnish and lacquer coating compositions whose films possess excellent acid, alkali, and water resistance.

Another object of the invention is to provide a new type of synthetic surface coating material which dries very rapidly in air to a hard, glossy film which is pale in color.

Another object of the invention is to provide an essentially saturated fatty acid which has been modified by a thermally induced reaction with cyclopentadiene, thereby providing new and useful resinous compositions of matter.

Another object of the invention is to convert essentially saturated fatty acids which are solid or liquid non-resinous products into resins useful in surface coating compositions by means of a thermally induced reaction with cyclopentadiene.

Another object of the invention is to provide a thermally polymerized cyclopentadiene resin which is modified with essentially saturated fatty acids, thereby imparting greater flexibility and resistance to oxidation to the resulting product.

These and other objects will become apparent from a consideration of the following disclosure.

The essentially saturated fatty acids, viz., those aliphatic carboxylic acids having ten to twenty-two carbon atoms, cannot be used in the preparation of drying oils and resins for the paint and varnish industry because, due to the lack of unsaturation, such products fail to "dry" in air or polymerize to a hard, tough film which becomes resistant to solvents and cleansing agents. If esterified with glycerine, fats are formed which have no drying properties and are useless in paints and varnishes except, to a limited extent, as plasticizers.

It is known that cyclopentadiene can be polymerized thermally, or catalytically by addition of small amounts (0.1 to 5.0 per cent) of the anhydrous halides of aluminum, iron, tin, and zinc, as well as with boron trifluoride, mineral acids and diatomaceous earths and synthetic zeolitic catalysts. The resins produced by this method are, in general, rather dark in color (3 to 8 Barrett scale), have marked staining characteristics, are difficultly soluble in drying oils, and the resin films become progressively brittle as aging occurs. Thermal polymerization of cyclopentadiene or its cyclic diene Diels-Alder polymers at temperatures above 390° F., while obviating the use of catalysts and subsequent neutralization difficulties, produces resinous polymers very pale in color (1 to 3 Barrett scale), but which are also difficultly soluble in drying oils, and which are not very stable to prolonged heating above 525° F. at atmospheric pressure. Heating cyclopentadiene at temperatures below 390° F. results essentially in the formation of crystalline diene polymers of the monomer, the polymerization proceeding via a 1,2; 1,4 addition. These products are of relatively low molecular weight, non-resinous, and as such find no application in the field of oleoresinous compositions.

The present invention involves the discovery that a very useful and previously unexpected reaction between cyclopentadiene and essentially saturated fatty acids can be induced thermally at temperatures essentially above 400° F. By the term "essentially saturated fatty acids" is meant those naturally occurring and synthetic aliphatic acids from capric ($C_{10}$) to behenic ($C_{22}$). The process results in the formation of new liquid and solid resinous products which are pale in color (1 to 3 Barrett scale), and which are compatible with drying oils as well as being soluble in the usual paint and varnish solvents and thinners. By employing temperatures in excess of 400° F., together with appropriate reaction time and concentration of the reactants, the production of the aforementioned Diels-Alders polymers of cyclopentadiene is, for all practical purposes, eliminated, and resinous products are formed whose molecular weight, color, melting point, acid number, and solubility characteristics depend upon the time, the temperature at which the reaction is carried out, the concentration of reactants, and solvents employed, if any.

I have found that the thermally induced reaction between cyclopentadiene and the fatty acids mentioned herein is accomplished and accompanied by an appreciable drop in the acid number of the original reaction mixture, which is probably due to the acylation of the unsaturated positions in cyclopentadiene and the thermally produced cyclopentadiene resinous polyene polymers by the fatty acids.

It is known that esters can be prepared synthetically by reactions between olefins and organic acids, such reactions being usually induced by catalysts such as dilute sulfuric acid or boron trifluoride. Thus, ethyl acetate is formed by reacting ethylene with acetic acid, and vinyl acetate by reacting acetylene with acetic acid, both reactions being catalyzed by dilute sulfuric acid. These reactions occur to a slight extent in the absence of catalysts at considerably higher temperatures, but the yield of esters is poor and more by-products are formed. This type of esterification, then, proceeds under the reaction conditions herein disclosed, and the resinous polymeric products produced have acid numbers appreciably lower than the initial reaction mixtures. When the amount of $C_{10}$ to $C_{22}$ essentially saturated fatty acids employed is less than thirty per cent, the thermal reaction with cyclopentadiene results in an 80 per cent esterification of the acids. The higher the percentage of fatty acid used, the softer will be the resinous products, and the acid number of the products also increase. The products possessing relatively high acid numbers (above 25 or 30) may be esterified with polyhydric alcohols such as glycerine, pentaerythritol, ethylene glycol, etc., thereby forming useful and new resinous products plasticized with saturated fatty acid polyesters.

In preparing the resinous products herein described I prefer to employ a fairly good grade of cyclopentadiene (95 to 100 pure), or a similar grade of dicyclopentadiene, of the $C_5H_6$ cyclic diene Diels-Alder polymers of cyclopentadiene which presumably depolymerize to the monomer under the reaction conditions employed in this invention. However, this invention is not necessarily limited to such a grade of purity for the hydrocarbon reactants, but hydrocarbon fractions rich in cyclopentadiene, its dimer, or the $C_5H_6$ cyclic Diels-Alder polymers thereof, such as special cuts of "crude solvent naphtha," dicyclopentadiene concentrates, "dripolene," and by-products obtained in the cracking of gaseous hydrocarbon mixtures, may also be used as sources of cyclopentadiene in the reactions. Various types and grades of essentially saturated fatty acids, such as hydrogenated soybean, cocoanut, stearic-palmitic, and lauric acids may also be employed within the scope of this invention.

In preparing the products which are the subject of this invention I prefer to employ reaction temperatures generally above 400° F., and usually between 400 and 650° F., although even higher temperatures may be used occasionally. The reaction is conducted in the liquid phase, and at the lower temperatures indicated, the pressure in the reaction vessel will be about 25 to 50 pounds per square inch, while pressures of 300 pounds per square inch or more may be attained at the higher reaction temperatures. The reaction may be carried out in the presence or absence of air, in an inert atmosphere, and solvents for the reactants, inert with respect thereto, may or may not be used. The time and temperature employed for any given reaction mixture depend upon the type of product desired, that is, upon such factors as (1) the percentage of fatty acids in the reaction mixture, (2) the acid number of the particular fatty acids (depends upon the molecular weight), (3) the acid number of the desired product, (4) the melting point and color of the desired product, (5) the amount of solvent used, if any, and (6) the desired solubility characteristics of the product. In general, high reaction temperatures and prolonged reaction periods result in products which are higher melting, darker in color, have higher molecular weights and lower order of solubility in drying oils than products which are formed at lower reaction temperatures and shorter reaction periods. The maximum amount of esterification of the fatty acids seems to occur at temperatures approximating 500° F. The effect of varying the above-mentioned factors will be brought out by an examination of the examples subsequently recited.

The reactions herein described may be carried out in sealed pressure vessels which are heated externally by means of a liquid maintained at the appropriate temperature, or the reactants may be passed or circulated through a reaction tube which is heated externally by means of a heat exchange medium. The products may also be produced by employing a continuous type reaction unit, whereby the fatty acids, admixed with cyclopentadiene, its cyclic diene Diels-Alder polymers, or hydrocarbon concentrates containing essentially these materials, are fed into a reaction tube, the temperature and time of reaction being governed by the properties desired in the finished products.

In preparing the products which are the subject of this invention, I prefer to react a mixture of cyclopentadiene (99 to 25 parts) or its diene polymers with an essentially saturated fatty acid within the group $C_{10}$ to $C_{22}$ (1 to 75 parts) by heating the reactants in a sealed vessel under superatmospheric pressure until a product having the desired properties is formed. However, these products may also be produced by heating cyclopentadiene or its cyclic diene polymers at superatmospheric pressures and at temperatures between 400 to 550° F., at which temperatures the cyclic diene polymers of cyclopentadiene are unstable, for relatively short periods of time (five to thirty minutes), thereby forming liquid and resinous cyclopentadiene polymers which are highly unsaturated in character (iodine number 200–225 Wijs method), and adding fatty acids to these polymers, subsequently heating the mixture at appropriate temperatures until the desired product is obtained. The products formed by employing either procedure are quite similar, but the time required is greater when the diene is prepolymerized prior to reaction with the acids.

The solid resinous products herein described may be incorporated directly into drying oils by the usual cooking procedures to produce oleoresinous vehicles which are pale in color, the varnish films being characterized by their rapid drying time, high gloss, excellent resistance to water, acid, and aqueous alkali, and improved flexibility. The solid products may also be dissolved in the usual types of paint and varnish thinners, such solutions being used as spirit varnishes and gloss oils. The films have greatly improved flexibility over straight cyclopentadiene resin films, and are more resistant to air oxidation. The liquid products produced by employing appropriate types of fatty acids can be used in solution in thinners, as baking varnishes, as well as additives to improve the drying time of varnish oils.

The following examples illustrate the preparation of these products and are intended to be merely exemplary, and are not cited by way of limiting the scope of the invention.

*Example 1*

Seventy-five grams of vacuum distilled cocoanut oil fatty acids (acid No. 260; iodine No. 8.0) is dissolved in 225 g. of cyclopentadiene. This mixture, which contains 25 per cent fatty acids, by weight, is placed in a stainless steel bomb in a nitrogen atmosphere, and the sealed bomb heated at 510° F. for three hours. The product is a soft, tacky, clear, pale yellow resin. Color 9 (Hellige); soluble in naphtha and aromatic solvents; acid No. 13.8. The drop in acid number of the reaction mixture indicates that 78 per cent of the acids originally present in the reaction mixture are present as resin esters in the product. This product can be cooked into drying oils to form varnish vehicles which dry rapidly and have excellent resistance to water, acid, and alkali. It can also be dissolved in naphtha and used as a spirit varnish, whose films can be either air-dried or baked at temperatures of 250–400° F. to form tough, chemically-resistant coatings.

*Example 2*

Fifty grams of hydrogenated soybean fatty acids (acid No. 195; iodine No. 2.0) is dissolved in 150 g. of dicyclopentadiene (95 per cent purity). This mixture, which contains 25 per cent fatty acids, by weight, is heated in a stainless steel bomb at 500° F. for five hours. The product is a pale yellow, slightly opaque, solid resin, which has the following properties: M. P. 175° F. (ball and ring); color 9 (Hellige); acid No. 4.12; soluble in naphtha and aromatic solvents, and in drying oils. The drop in acid number of the reaction mixture indicates that 91.5 per cent of the acids originally present in the reaction mixture are present as resin esters in the product.

*Example 3*

One hundred grams of dicyclopentadiene and 100 g. of stearic acid (acid No. 185) is placed in a stainless steel bomb and heated at 490° F. for 6 hours. The product is a pale yellow opaque soft solid, which contains crystalline unreacted stearic acid. The acid No. is 32.0, which indicates that 67.6 per cent of the acids originally present in the reaction mixture are present as resin esters of stearic acid in the product. A solution of the product in a hydrocarbon solvent such as benzene or heptane may be extracted with aqueous alkaline solutions to remove the excess stearic acid, producing an essentially neutral spirit varnish which forms films which dry rapidly and are quite flexible.

The product may also be esterified with glycerine or pentaerythritol to form flexible plastic coatings having utility in the field of surface coating compositions. For example, 100 g. of this product is heated at 450°–500° F. in vacuo with 2.0 g. of glycerine or 2.5 g. of pentaerythritol, the acid number is reduced to about 5 to 7, and the resulting products form clear, flexible, plastic coatings which have excellent resistance to water and acid.

*Example 4*

Forty grams of palmitic acid is dissolved in 65 g. of dicyclopentadiene concentrate which, by analysis, consists of 65 per cent of dicyclopentadiene and the trimers and tetramers of cyclopentadiene, together with about 20 per cent of other thermally polymerizable olefins. This mixture is heated in a stainless steel bomb at 490° F. for six hours, after which the product is subjected to distillation to a temperature of 500° F. in a 29-inch vacuum. The residual product is a clear, pale yellow resin, with the following properties: M. P. 160° F.; color 8 (Hellige); acid No. 32.0; soluble in aromatic and naphtha solvents, and in drying oils.

*Example 5*

One hundred grams of cyclopentadiene is heated in a pressure vessel at 500° F. for 30 minutes, and to the resulting mixture of clear, viscous, resinous polyene polymers is added 40 g. of lauric acid. This mixture is then heated for five hours at 500–510° F., and the final product is a solid, clear resin with the following properties: M. P. 185° F.; color 8 (Hellige); soluble in naphtha and aromatic solvents and can be readily cooked into drying oils at 525–550° F. to form flexible, durable, fast-drying varnishes which have excellent color and resistance to water, acid, and aqueous alkali. The acid number of the product is 12.5, indicating that 75 per cent of the acids acylated the resin.

*Example 6*

A mixture of 70 parts of a commercially available "dicyclopentadiene concentrate," which contains about 65 per cent of a mixture of cyclic diene Diels-Alder polymers of cyclopentadiene and about 20 per cent of other heat polymerizable olefins is mixed with 30 parts of hydrogenated soybean oil fatty acids (acid No. 195), and the resulting mixture is passed continuously through a tube which is heated at 525–530° F., with a reaction time of 30 minutes and a pressure of 350 to 400 pounds per square inch. The product is a very viscous liquid which has an acid number of 38.5 which indicates that 35.0 per cent of the acids in the original reaction mixture are present as esters in the product. This material, when esterified with an equivalent amount of glycerine (100 parts product to 2.0 parts glycerine) gives a satisfactory drying oil extender.

The foregoing examples and specification will naturally suggest to those skilled in the art numerous modifications, variations and ramifications of the basic principles of my invention; all these are considered to be comprehended within the scope of my invention as defined by the following claims.

I claim as my invention:

1. A process for preparing a new composition of matter which consists in thermally reacting a mixture of from about 99 to 25 parts by weight cyclopentadiene and aliphatic saturated carboxylic acid having from ten to twenty-two carbon atoms to the molecule at a temperature above about 400° F. and in the liquid phase in the absence of a catalyst.

2. A process for preparing a new composition of matter which consists in thermally reacting a mixture of from about 99 to 25 parts by weight of cyclopentadiene and from about 1 to 75 parts by weight of saturated fatty acid having from ten to twenty-two carbon atoms to the molecule at a temperature of from 400° to 650° F. and at a superatmospheric pressure adequate to maintain the reactants in the liquid phase in the absence of a catalyst.

3. A process according to claim 2 in which the cyclopentadiene is thermally polymerized at a temperature between 400–550° F. for from 5 to 30 minutes before being thermally reacted with the fatty acid.

4. A process according to claim 2 in which the cyclopentadiene is utilized in the form of its $C_5H_6$ cyclic diene polymers which are capable of depolymerizing at the temperatures employed in the thermal reaction.

5. A process according to claim 2 in which the thermal reaction product is subsequently esterified with a polyhydric alcohol.

6. The product formed in accordance with the process of claim 2.

7. As a new composition of matter, the polyhydric alcohol ester of the product formed in accordance with the process of claim 2.

CARL F. PETERS.

REFERENCES CITED

The following references are of record in the file of this patent:

UNITED STATES PATENTS

| Number | Name | Date |
|---|---|---|
| 2,318,034 | Wayne | May 4, 1943 |
| 2,387,895 | Gerhart | Oct. 30, 1945 |
| 2,392,732 | Gerhart | Jan. 8, 1946 |
| 2,397,600 | Gerhart | Apr. 2, 1946 |